US007768649B2

(12) United States Patent
Heebner

(10) Patent No.: US 7,768,649 B2
(45) Date of Patent: Aug. 3, 2010

(54) SYSTEM AND METHOD FOR ULTRAFAST OPTICAL SIGNAL DETECTING VIA A SYNCHRONOUSLY COUPLED ANAMORPHIC LIGHT PULSE ENCODED LATERALLY

(75) Inventor: John E. Heebner, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 156 days.

(21) Appl. No.: 12/193,841

(22) Filed: Aug. 19, 2008

(65) Prior Publication Data

US 2010/0046001 A1  Feb. 25, 2010

(51) Int. Cl.
*G01B 9/02* (2006.01)
*G02B 6/00* (2006.01)
(52) U.S. Cl. ......................................... 356/477; 385/12
(58) Field of Classification Search ................. 356/477; 385/12
See application file for complete search history.

(56) References Cited

U.S. PATENT DOCUMENTS

| 5,911,018 | A * | 6/1999 | Bischel et al. ................. 385/14 |
| 6,141,465 | A * | 10/2000 | Bischel et al. ................. 385/4 |
| 6,282,332 | B1 * | 8/2001 | Bosso et al. .................... 385/7 |
| 7,394,948 | B1 * | 7/2008 | Zheng et al. .................... 385/3 |
| 7,394,949 | B1 * | 7/2008 | Feng et al. ...................... 385/3 |
| 7,522,783 | B2 * | 4/2009 | Glebov et al. ................... 385/2 |
| 2004/0156573 | A1 * | 8/2004 | Shioda et al. .................. 385/2 |
| 2004/0175174 | A1 | 9/2004 | Suhami ......................... 398/43 |
| 2010/0046001 | A1 * | 2/2010 | Heebner ....................... 356/477 |

OTHER PUBLICATIONS

Walden, Robert H., "Analog-to-Digital Converter Survey and Analysis" IEEE Journal on Selected Areas In Communications, vol. 17, No. 4. Apr. 1999.

* cited by examiner

*Primary Examiner*—Patrick J Connolly
(74) *Attorney, Agent, or Firm*—John H. Lee; James S. Tak

(57) ABSTRACT

In one general embodiment, a method for ultrafast optical signal detecting is provided. In operation, a first optical input signal is propagated through a first wave guiding layer of a waveguide. Additionally, a second optical input signal is propagated through a second wave guiding layer of the waveguide. Furthermore, an optical control signal is applied to a top of the waveguide, the optical control signal being oriented diagonally relative to the top of the waveguide such that the application is used to influence at least a portion of the first optical input signal propagating through the first wave guiding layer of the waveguide. In addition, the first and the second optical input signals output from the waveguide are combined. Further, the combined optical signals output from the waveguide are detected. In another general embodiment, a system for ultrafast optical signal recording is provided comprising a waveguide including a plurality of wave guiding layers, an optical control source positioned to propagate an optical control signal towards the waveguide in a diagonal orientation relative to a top of the waveguide, at least one optical input source positioned to input an optical input signal into at least a first and a second wave guiding layer of the waveguide, and a detector for detecting at least one interference pattern output from the waveguide, where at least one of the interference patterns results from a combination of the optical input signals input into the first and the second wave guiding layer. Furthermore, propagation of the optical control signal is used to influence at least a portion of the optical input signal propagating through the first wave guiding layer of the waveguide.

30 Claims, 6 Drawing Sheets

TOP VIEW OF SIGNAL WITH
SUPERIMPOSED DIAGONALLY
ORIENTATED CONTROL SIGNAL

US 7,768,649 B2

SYSTEM AND METHOD FOR ULTRAFAST OPTICAL SIGNAL DETECTING VIA A SYNCHRONOUSLY COUPLED ANAMORPHIC LIGHT PULSE ENCODED LATERALLY

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to detecting optical signals, and more particularly to mapping fast optical signals from serial temporal representations into parallel spatial representations for subsequent recording.

BACKGROUND

Conventional signal recording technologies include vacuum tube oscilloscopes and digital oscilloscopes. Vacuum tube oscilloscopes are becoming obsolete because of the inability to satisfy the demands associated with new technology. Digital oscilloscopes rely largely on state-of-the-art electronic-based analog-to-digital converters that have exhibited very slow improvement in recent years.

While the sampling resolution of digital oscilloscopes has improved incrementally, the dynamic range at the maximum sampling rate is inversely related to it, forcing a tradeoff between sampling resolution and dynamic range.

SUMMARY

In one general embodiment, a method for ultrafast optical signal detecting is provided. In operation, a first optical input signal is propagated through a first wave guiding layer of a waveguide. Additionally, a second optical input signal is propagated through a second wave guiding layer of the waveguide. Furthermore, an optical control signal is applied to a top of the waveguide, the optical control signal being oriented diagonally relative to the top of the waveguide such that the application is used to influence at least a portion of the first optical input signal propagating through the first wave guiding layer of the waveguide. In addition, the first and the second optical input signals output from the waveguide are combined. Further, the combined optical signals output from the waveguide are detected.

Other aspects and embodiments of the present invention will become apparent from the following detailed description, which, when taken in conjunction with the drawings, illustrate by way of example the principles of the invention.

DETAILED DESCRIPTION

Figure 1:
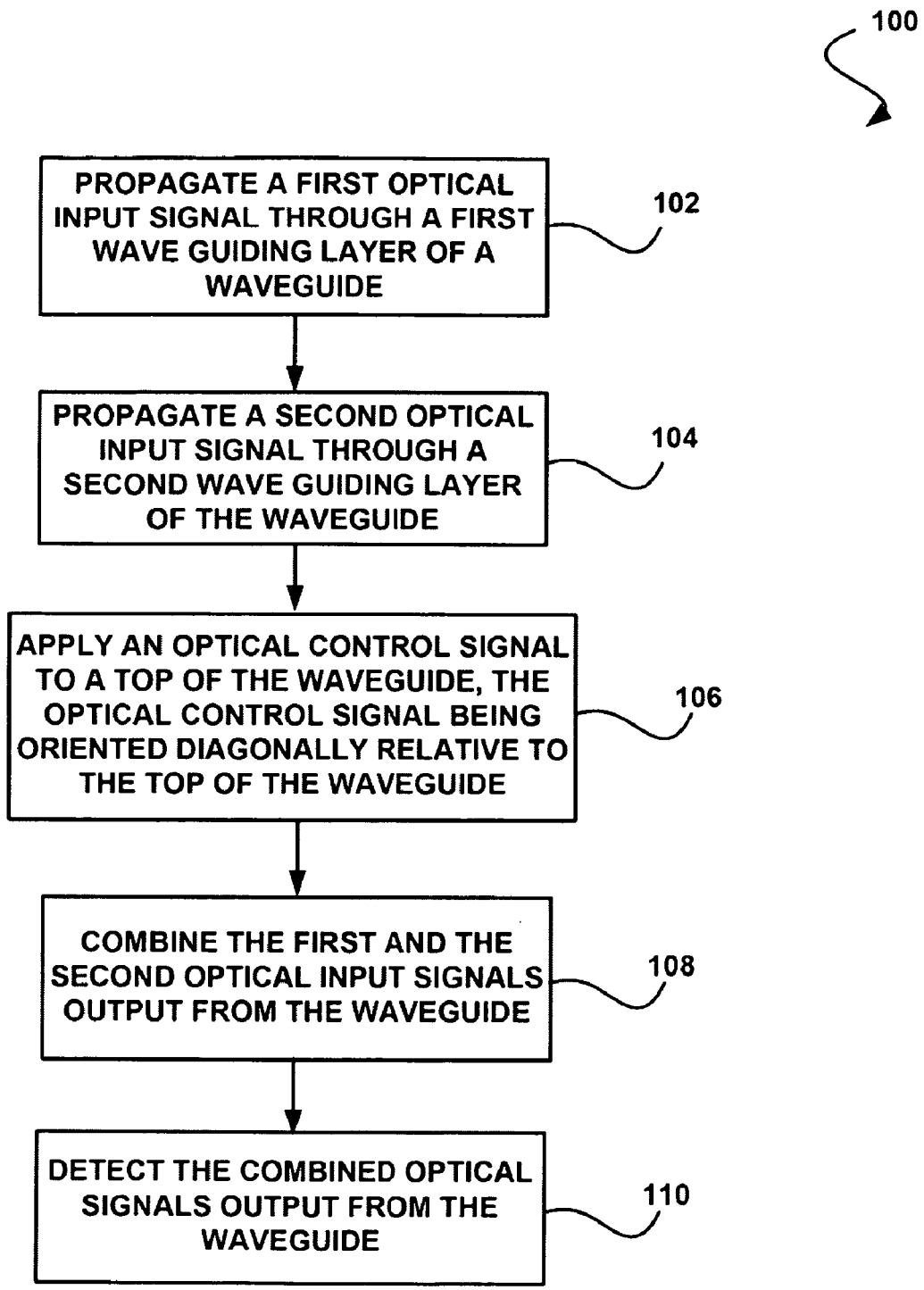
FIG. 1 shows a method for detecting an optical signal input into a waveguide, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a method for ultrafast optical signal detecting is provided. In operation, a first optical input signal is propagated through a first wave guiding layer of a waveguide. Additionally, a second optical input signal is propagated through a second wave guiding layer of the waveguide. Furthermore, an optical control signal is applied to a top of the waveguide, the optical control signal being oriented diagonally relative to the top of the waveguide such that the application is used to influence at least a portion of the first optical input signal propagating through the first wave guiding layer of the waveguide. In addition, the first and the second optical input signals output from the waveguide are combined. Further, the combined optical signals output from the waveguide are detected.

In another general embodiment, a system for ultrafast optical signal recording is provided comprising a waveguide including a plurality of wave guiding layers, an optical control source positioned to propagate an optical control signal towards the waveguide in a diagonal orientation relative to a top of the waveguide, at least one optical input source positioned to input an optical input signal into at least a first and a second wave guiding layer of the waveguide, and a detector for detecting at least one interference pattern output from the waveguide, where at least one of the interference patterns results from a combination of the optical input signals input into the first and the second wave guiding layer. Furthermore, propagation of the optical control signal is used to influence at least a portion of the optical input signal propagating through the first wave guiding layer of the waveguide.

As mentioned above, in general, the dynamic range at the maximum sampling rate is inversely related to the sampling resolution, forcing a tradeoff between sampling resolution and dynamic range. At least some embodiments of the present invention addresses this limitation by decoupling the sampling resolution and dynamic range through a method of ultrafast optical signal detecting via a synchronously coupled anamorphic light pulse encoded laterally.

More illustrative information will now be set forth regarding various optional architectures and features with which the foregoing framework may or may not be implemented, per the desires of the designers or user. It should be strongly noted that the following information is set forth for illustrative purposes and should not be construed as limiting in any manner. Any of the following features may be optionally incorporated with or without the exclusion of other features described.

FIG. 1 shows a method 100 for detecting an optical signal input into a waveguide, in accordance with one embodiment. As shown, a first optical input signal is propagated through a first wave guiding layer of a waveguide. See operation 102. In the context of the present description, a waveguide refers to any structure capable of guiding a light wave.

Additionally, a second optical input signal is propagated through a second wave guiding layer of the waveguide. See operation 104. As an option, the second wave guiding layer may be positioned below the first wave guiding layer relative to the top of the waveguide.

Furthermore, an optical control signal is applied to a top of the waveguide. See operation 106. In this case, the optical control signal is oriented diagonally relative to the top of the waveguide such that the application is used to influence at least a portion of the first optical input signal propagating through the first wave guiding layer of the waveguide.

In addition, the first and the second optical input signals output from the waveguide are combined. See operation 108. In this case, the combining may include generating an interference pattern. For example, the second optical input signal may be utilized as a reference signal for interferometric sampling of the first and the second optical input signals when the signals are combined. In this way, the first and the second wave guiding layers may be coupled to form a Mach-Zehnder interferometer.

Upon application of the optical control signal, material characteristics of the waveguide may be altered in locations defined by the optical control signal. The altered material characteristics of the waveguide may then alter optical characteristics of the first optical input signal propagating in the first wave guiding layer. For example, the altered material characteristics of the first wave guiding layer may include an index of refraction. In this case, the refractive index experienced by the first optical input signal may be modified in proportion to a local fluence or intensity of the optical control signal.

Furthermore, the second optical input signal in the second wave guiding layer may be uninfluenced by the optical control signal. For example, the first and the second wave guiding layers may include a high absorbing material at a spectrum of the optical control signal such that the residual control signal impacting the second wave guiding layer is negligible.

Additionally, applying the optical control signal may cause a lateral encoding of a sliced switchout point in time across the first optical input signal. As part of the combining, the first and the second optical input signals may then diffract into each other, spatially generating an interference pattern. The combined optical signals output from the waveguide may then be detected. See operation 110.

In one embodiment, the detection may be performed utilizing an array of detectors. In another embodiment, the detection may be performed utilizing a camera. In these cases, the interference pattern between the first and second signals output from the waveguide may be detected. As an option, the detected signal may be recorded and stored in memory.

It should be noted that the optical control signal may include laser light from a pulsed laser source synchronized with the input signals. Furthermore, to have an efficient effect upon the guiding layer, the control beam may be highly absorbing. This may be accomplished by ensuring that the wavelength of the optical control signal pulse is shorter than the band gap wavelength of the material used for the guiding layers.

It should also be noted that, in various embodiments, the first and the second optical input signals may be signals from the same or different sources. In one embodiment, the first optical input signal and the second optical input signal may be portions of a common optical input signal. For example, the common optical input signal may include a single, overfilled, injected laser beam that inputs light into both the first and the second wave guiding layers.

As another option, the common optical input signal may be a signal from an optical source that has been split into a first and a second optical input signal. In another embodiment, the first and the second optical input signal may be provided by two different optical sources.

While the method 100 is described in the context of a first and a second wave guiding layer, any number of wave guiding layers may be included in the waveguide such that pairs of guiding layers are capable of providing interferometric sampling of beams input into the pair of wave guiding layers.

Figure 2:
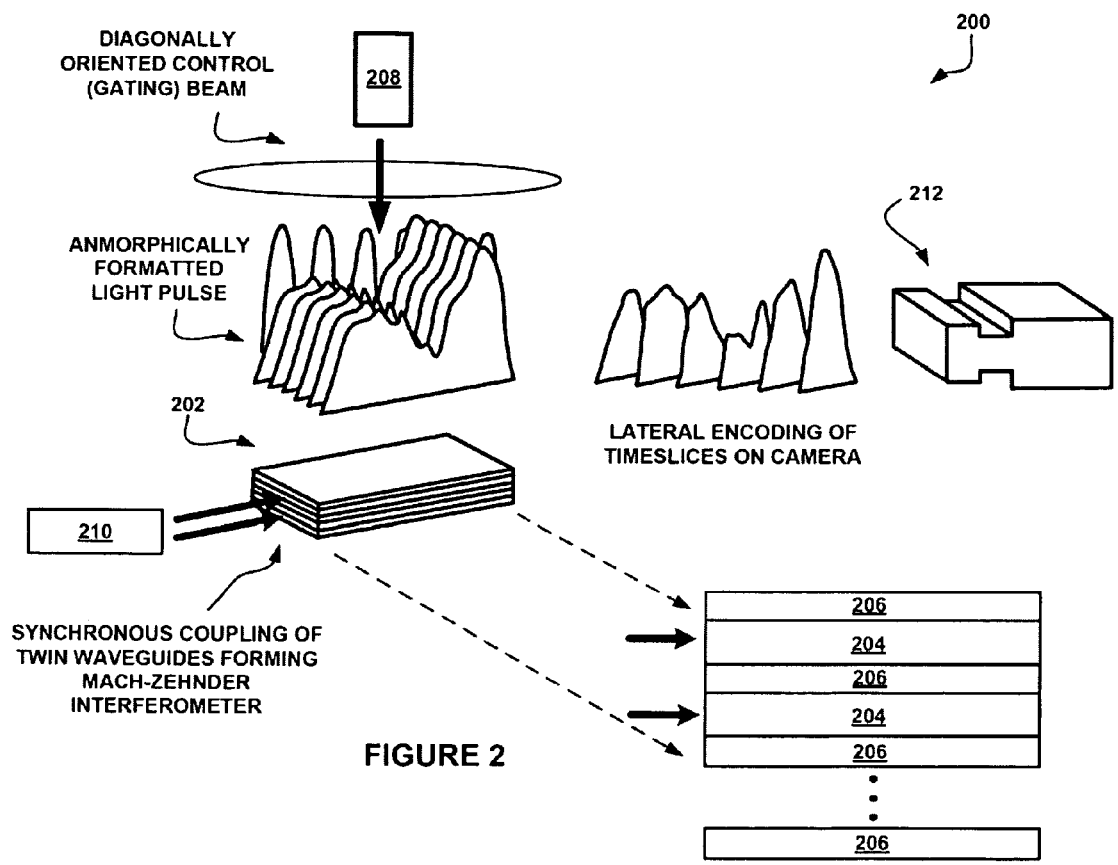
FIG. 2 show a system for detecting and recording an optical signal input into a waveguide, in accordance with one embodiment.

FIG. 2 show a system 200 for detecting and recording an optical signal input into a waveguide, in accordance with one embodiment. As an option, the system 200 may be implemented to carry out the method 100 of FIG. 1. Of course, however, the system 200 may be implemented in any desired environment. It should also be noted that the aforementioned definitions may apply during the present description.

Figure 3:
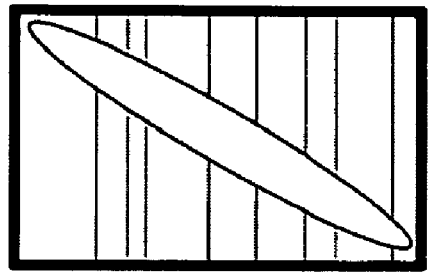
FIG. 3 shows a top-down view of a wave guide with a superimposed diagonally oriented control signal, in accordance with one embodiment.

As shown, the system 200 comprises a waveguide 202 including a plurality of wave guiding layers 204. In one embodiment, a cladding layer 206 may be positioned between adjacent wave guiding layers 204. Furthermore, the system 200 includes an optical control source 208 positioned to propagate an optical control signal towards the waveguide 202 in a diagonal orientation relative to a top of the waveguide 202. In one approach, the axis of the path of the optical control signal is about perpendicular to the top of the waveguide 202, while a periphery of the optical control signal striking the top of the waveguide has a generally elongated shape, e.g., rectangular, elliptical, etc. See, e.g., FIG. 3, showing an elliptical illumination periphery. An angle of a line defined between farthest extents of the periphery and parallel to the top of the waveguide and a path of the first and second optical signals as they pass through the waveguide may be between 0 and 90 degrees. As shown in FIG. 3, an illustrative angle is between about 20 and about 45 degrees.

At least one optical input source 210 is also provided, positioned to input an optical input signal into at least a first and a second wave guiding layer of the waveguide 202. A detector 212 may also be included for detecting at least one interference pattern output from the waveguide, at least one of the interference patterns resulting from a combination of the optical input signals input into the first and the second wave guiding layer. Furthermore, the system 200 is configured such that the propagation of the optical control signal is used to influence at least a portion of the optical input signal propagating through the first wave guiding layer of the waveguide 200.

It should be noted that, the wave guiding layers 204 may include any material suitable for optical guiding. For example, in various embodiments, at least one of the guiding layers 204 may include GaAs, AlGaAs, InGaAs, InGaAsP, and/or Si. The material of the cladding layers 206 may include any suitable material used in the context of waveguides, such as AlGaAs, InGaAsP, Si, oxides, etc.

Although not shown, the waveguide 202 may be constructed on a substrate, where the substrate material includes any suitable material used in the context of waveguides, such as GaAs, InP, Si, etc. Thus, the system 200 may be configured to operate over a broad spectral band in the visible to near-infrared range using group III-V semiconductors such as GaAs, AlGaAs, InGaAs, InGaAsP, as well as group IV semiconductors such as Silicon and may be extendable to other spectral regions of interest in the visible, UV, and far infrared using other fluence-dependent or intensity-dependent nonlinear mechanisms.

It should be noted that the system 200 geometry may be utilized in multiple dimensions. For example, in one embodiment, a stack of planar waveguides may be grown or assembled enabling an extension to a one-dimensional imaging geometry. Multiple planes of deflection may be engineered in a vertically layered structure grown using a variety of known semiconductor growth techniques including molecular-beam epitaxy (MBE), metalorganic chemical vapor deposition (MOCVD), metalorganic vapor phase epitaxy (MOVPE), etc.

Using the system 200, fast optical signals may be encoded from a temporal representation into a spatial representation for subsequent recording on a parallel array of detectors. As noted above, it is well established that the dynamic range of a time sampler is inversely related to its sampling rate across a wide range of technologies. By decoupling the sampling rate from the dynamic range using the system 200, issues associated with such relationship may be at least mitigated.

Using the waveguide 202, including the stacked wave guiding layers 204, as a vertical Mach-Zehnder interferometer, the waveguide 202 may be top-illuminated by the control beam. A short optical control signal pulse oriented diagonally may be applied from the top to modify a phase shift of the light corresponding to the input signal in the upper (e.g. the first) wave guiding layer. The light in the lower wave guiding layer may then serve as a reference for interferometric sampling when the beams recombine at an output of the waveguide 202. FIG. 3 shows a top-down view of the wave guide 202 with a superimposed diagonally oriented control signal, in accordance with one embodiment.

Because the control beam is oriented diagonally to the top of the waveguide 202, there is a lateral encoding of the sliced switchout point in time across the input signal beam in the top wave guiding layer. In this case, the lateral encoding (x) of a time domain (t) of the input signal is proportional to the speed of light (c) in the first wave guiding layer and the orientation angle ($\theta$) of the control signal according to the equation $x=t*c/[n_g \tan(\theta)]$, where $n_g$ is the group index of refraction top wave guiding layer.

Figure 4:
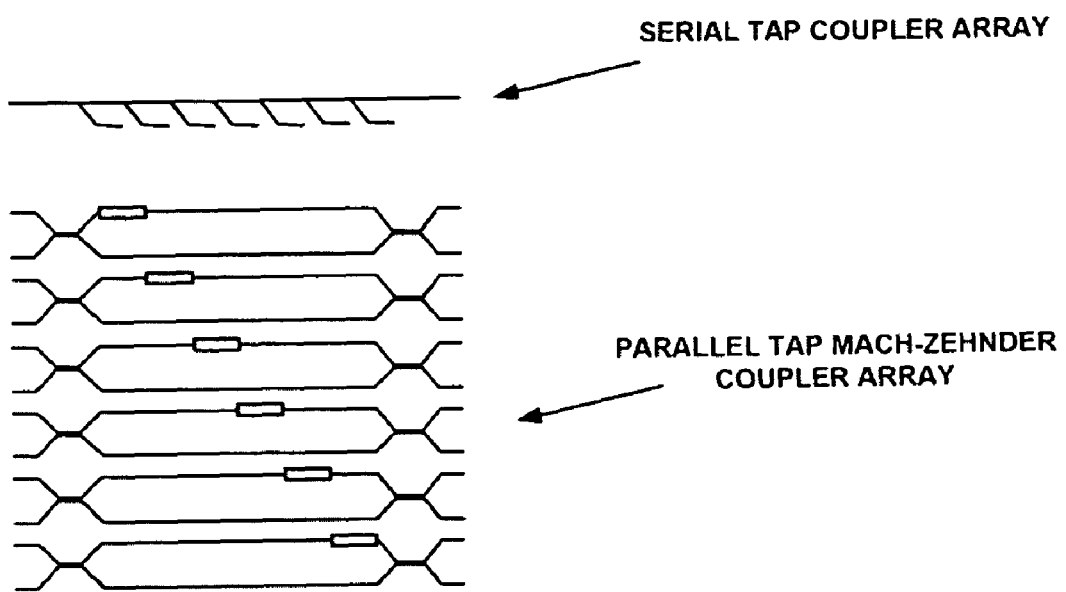
FIG. 4 shows an input signal of a serial tap coupler array compared to an input signal of a parallel tap Mach-Zehnder coupler array, in accordance with one embodiment.

As an option, this technique may be visualized as making N copies of the signal pulse (where N is the number of sampled elements) and gating each of them at different times laterally across the waveguide 202. This may be seen as a parallel analog of a serial tap coupler array as illustrated in FIG. 4.

Using the system 200, a complicated fabrication process involving lateral patterning or etching may be avoided, as the waveguide 202 may be constructed utilizing standard vertical growth fabrication techniques. Furthermore, any fabrication imperfections may be compensated for after fabrication.

In one embodiment, splitting and combining couplers may be fabricated directly into the waveguide 202. In this case, the splitting coupler may be utilized to split the input beam into the wave guiding layers 204 and the combining couplers may be used to combine two of the optical signals output from the waveguide 202 for interference.

In another embodiment, the input beam may be simultaneously coupled into two wave guiding layers with a single overfilling injected beam. In this case, the outputs may be allowed to diffract into each other, spatially generating an interference pattern. Since the signal copies of the input beam are co-propagating in nearly identical wave guiding layers that are in robust mechanical registration directly above one another, the stacked vertical wave guiding layers provide a high degree of insensitivity to thermal and mechanical fluctuations.

Additionally, the system 200 is fabrication tolerant with regards to achieving a high switchout contrast independent of asymmetries between the wave guiding layers 204. For high contrast, a deep null initial condition with no control signal induced switchout may be implemented at the device output.

Figure 5A:
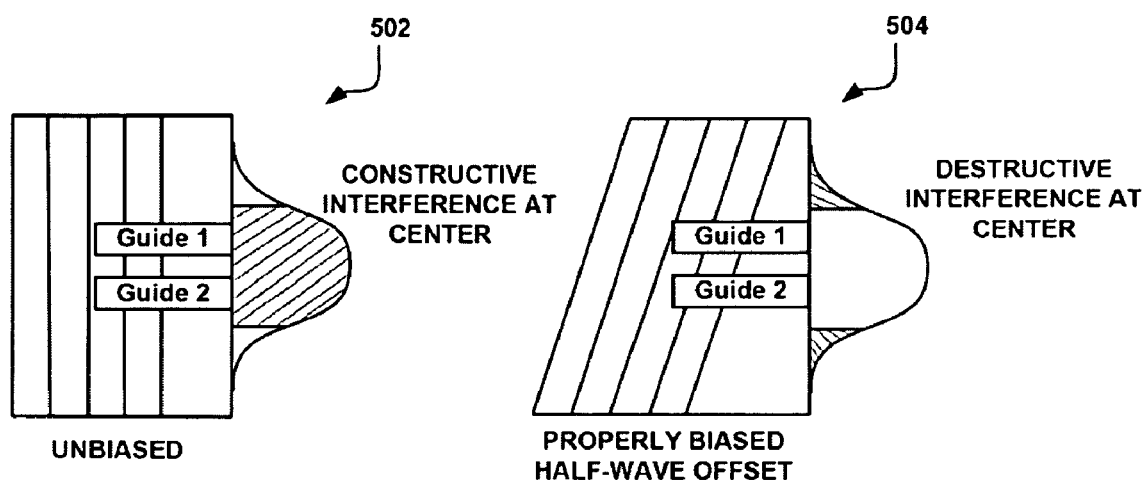
FIG. 5A shows an unbiased output signal and a biased output signal with a half-wave offset for destructive interference, in accordance with one embodiment.
Figure 5B:
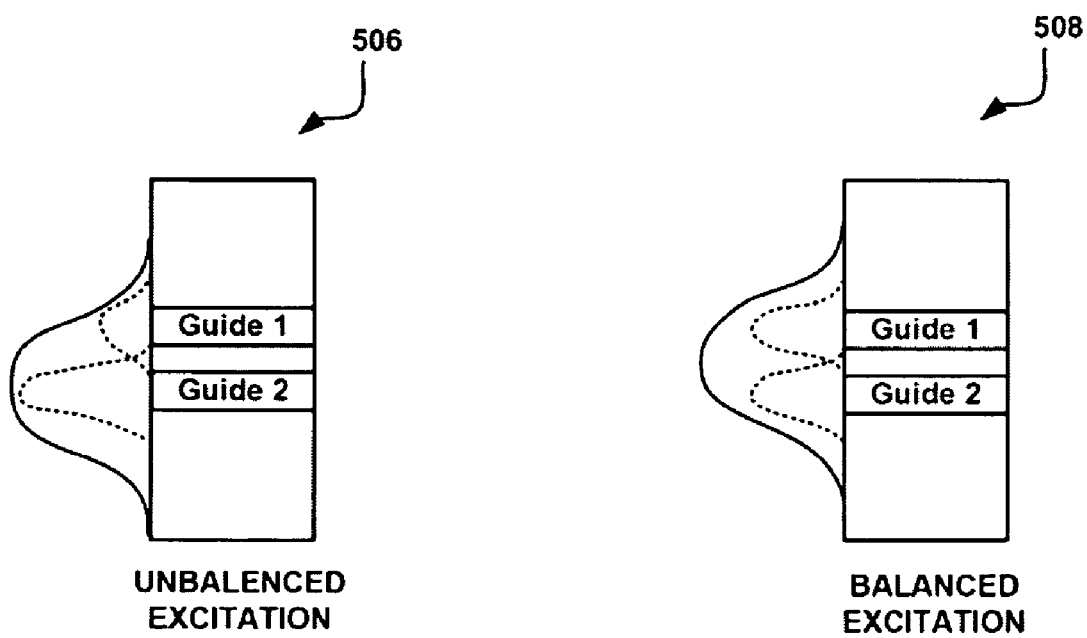
FIG. 5B shows an output signal with an un-balanced intensity and an output signal with a balanced intensity, in accordance with one embodiment.

In one embodiment, such implementation may be accomplished by allowing twin signal copies of the input signal (i.e. the first and the second input signal) to emerge with a precise half-wave offset for destructive interference and by further balancing the twin signal copies in intensity. FIG. 5A shows an unbiased output signal 502 and a biased output signal with a half-wave offset 504 for destructive interference, in accordance with one embodiment. FIG. 5B shows an output signal 506 with an unbalanced intensity and an output signal 508 with a balanced intensity, in accordance with one embodiment.

In order to bias the waveguide 202, which in this example is operating as a Mach-Zehnder interferometer, for maximum contrast, the launch condition of the input beam may be adjusted with a slight vertical tilt and/or vertical offset. In this case, the magnitude of the tilt to achieve a half-wave offset may depend on the vertical spacing between the waveguides and the wavelength of the optical input signal. Furthermore, any differential phase offset perhaps resulting from fabrication errors incurred after propagating through the wave guides may be compensated in this manner. Additionally, the magnitude of the vertical offset can be tailored to compensate for differences in the relative throughput of the two wave guiding layers 204 (i.e. the first and the second wave guiding layers). In this way, the input beam may be adjusted with an angular offset to control phase bias and/or with a vertical offset to control amplitude balance.

In order to enable interferometric switchout, the optical control beam may only modulate the upper wave guiding layer (i.e. the first wave guiding layer) while leaving the lower wave guiding layer (i.e. the second wave guiding layer) unaffected to serve as an interferometric reference. As noted above, in one embodiment, this may be achieved by designing the wave guiding layers 204 or other layers to be highly absorbing at the incident control beam spectrum such that the residual control beam impacting the second guide is negligible or blocked altogether. In this case, any residual leakage will not compromise performance of the wave guide 202, as a higher control signal energy may be utilized to achieve the same relative half wave offset.

In one embodiment, the half wave offset may be achieved by modulation of the wave guiding layers through a nonlinear optical effect. Specifically, the refractive index experienced by the signal may be modified in proportion to the local fluence of the control beam. In this case, a latching nonlinear effect typical of semiconductors with a fast rise time and a slow recovery time may be employed.

For example, the control signal energy may be adjusted to apply a full-wave offset at steady state. The output of the wave guide 202 may then be driven from a primary null through a peak and back to a secondary null. However, there may be a brief moment during the rise time in which a momentary gate is open. In this case, the gate width temporal resolution may depend upon the rise time of the nonlinear effect, the control beam pulse width, and the control beam width. It should be noted that, the control beam pulse width, and the control beam width may be tailored explicitly with beam and pulse shaping elements or more simply via de-compression (e.g. residual chirp) or defocusing (e.g. residual wavefront).

The laterally encoded output beam may be recorded by imaging a plane slightly past the output plane of the wave guiding layers 204 for diffractive overlap. The laterally encoded output beam may be recorded using a detector array at the focal plane of a camera, for example. In this case, the detectors need not necessarily possess a fast response since the detectors are detecting a gated slice of time that varies laterally across the recorded beam. This allows use of a slower detector array that is not limited to a low dynamic range. In one embodiment, the record length may be limited by the time of flight of the device (i.e. the overall length of the waveguide 202).

Using the system 200, a fast optical signal may be recorded without experiencing an attenuation gradient across the record. Additionally, for pulsewidths shorter than the rise time of the material response, the sampling function does not depend on the pump pulse shape and any shape with a width shorter than the desired resolution is sufficient. Furthermore, the optical control signal may include a simple, diagonally oriented ellipse controlled by rotating a cylindrical focusing lens, which allows for flexibility when choosing a control signal source.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   propagating a first optical input signal through a first wave guiding layer of a waveguide;
   propagating a second optical input signal through a second wave guiding layer of the waveguide;
   applying an optical control signal to a top of the waveguide, the optical control signal being oriented diagonally relative to the top of the waveguide such that the application influences at least a portion of the first optical input signal propagating through the first wave guiding layer of the waveguide;
   combining the first and the second optical input signals output from the waveguide; and
   detecting the combined optical signals output from the waveguide.

2. The method of claim 1, wherein the combining includes generating an interference pattern.

3. The method of claim 1, wherein the second optical input signal is utilized as a reference signal for interferometric sampling of the first and the second optical input signals when the signals are combined.

4. The method of claim 1, wherein the first and the second wave guiding layers are coupled to form a Mach-Zehnder interferometer.

5. The method of claim 1, wherein the second wave guiding layer is positioned below the first wave guiding layer relative to the top of the waveguide.

6. The method of claim 1, wherein the application causes a lateral encoding of a sliced switchout point in time across the first optical input signal.

7. The method of claim 6, wherein the lateral encoding (x) of a time domain (t) of the first optical input signal is proportional to the speed of light (c) in the first wave guiding layer and the orientation angle ($\theta$) of the optical control signal according to the equation $x=t*c/[n_g *\tan(\theta)]$, where $n_g$ is the group index of refraction of the first wave guiding layer.

8. The method of claim 1, wherein the first optical input signal and the second optical input signal are portions of a common optical input signal.

9. The method of claim 8, wherein the common optical input signal includes a single, overfilled, injected laser beam.

10. The method of claim 9, wherein the combining includes allowing the first and the second optical input signals to diffract into each other, spatially generating an interference pattern.

11. The method of claim 1, wherein the second optical input signal in the second wave guiding layer is uninfluenced by the optical control signal.

12. The method of claim 11, wherein the first and the second wave guiding layers include a high absorbing material at a spectrum of the optical control signal such that a residual control signal impacting the second wave guiding layer is negligible.

13. The method of claim 1, wherein the applied optical control signal alters material characteristics of the first wave guiding layer.

14. The method of claim 13, wherein the altered material characteristics of the first wave guiding layer include an index of refraction.

15. The method of claim 14, wherein the index of refraction is modified in proportion to a local fluence of the optical control signal.

16. The method of claim 15, wherein input energy of the optical control signal is adjusted to apply a full-wave offset to the detected combined optical signals output from the waveguide at steady state.

17. The method of claim 16, wherein the adjustment causes a primary null of an interference pattern of the detected combined optical signals output from the waveguide to pass through a peak and back to a secondary null.

18. The method of claim 17, wherein a gate width temporal resolution depends upon a rise time of a nonlinear effect of the refractive index experienced by the first optical input signal, a pulse width of the optical control signal, and a beam width of the optical control signal.

19. The method of claim 1, further comprising recording the detected optical signals output from the waveguide.

20. The method of claim 19, wherein a record length of the recording is limited by an overall length of the waveguide.

21. The method of claim 1, wherein the detecting is performed utilizing an array of detectors.

22. The method of claim 1, wherein the detecting is performed utilizing a camera.

23. The method of claim 1, wherein the optical control signal includes laser light from a pulsed laser source synchronized with the first and second optical input signals.

24. The method of claim 1, wherein a wavelength of the optical control signal is shorter than a band gap of a material used for the first and the second wave guiding layers.

25. The method of claim 1, wherein the waveguide includes a plurality of wave guiding layers in addition to the first and the second wave guiding layers.

26. The method of claim 25, wherein a cladding layer is positioned between adjacent wave guiding layers.

27. The method of claim 1, wherein at least one of the first or second wave guiding layers include at least one of GaAs, AlGaAs, InGaAs, InGaAsP, and Si.

28. The method of claim 1, wherein a launch condition of the first optical input signal and the second optical input signal is adjusted with an angular offset to control phase bias.

29. The method of claim 1, wherein a launch condition of the first optical input signal and the second optical input signal is adjusted with a vertical offset to control amplitude balance.

30. A system comprising:
a waveguide including a plurality of wave guiding layers;
an optical control source positioned to propagate an optical control signal towards the waveguide in a diagonal orientation relative to a top of the waveguide;
at least one optical input source positioned to input an optical input signal into at least a first and a second wave guiding layer of the waveguide; and
a detector for detecting at least one interference pattern output from the waveguide, at least one of the interference patterns resulting from a combination of the optical input signals input into the first and the second wave guiding layer;
wherein propagation of the optical control signal is used to influence at least a portion of the optical input signal propagating through the first wave guiding layer of the waveguide.

* * * * *